United States Patent

Ketcham et al.

[11] 3,983,320
[45] Sept. 28, 1976

[54] RASTER DISPLAY HISTOGRAM EQUALIZATION

[75] Inventors: David J. Ketcham; Roger W. Lowe, both of Lakewood; Michael D. Pruznick, Huntington Beach; Eugene W. Opittek, Santa Ana, all of Calif.

[73] Assignee: Hughes Aircraft Company, Culver City, Calif.

[22] Filed: Aug. 25, 1975

[21] Appl. No.: 608,319

[52] U.S. Cl. .............................. 178/6.8; 340/172.5; 343/5 DP
[51] Int. Cl.² .......................................... H04N 3/00
[58] Field of Search ................. 178/6.8, 6, DIG. 34, 178/DIG. 21, DIG. 22; 340/324 A, 172.5; 343/5 DP; 358/37

[56] References Cited
UNITED STATES PATENTS

| | | | |
|---|---|---|---|
| 3,728,481 | 4/1973 | Froehlich | 178/DIG. 34 |
| 3,757,038 | 9/1973 | Jannery | 178/6.8 |
| 3,829,614 | 8/1974 | Ahlbom | 178/6.8 |
| 3,903,357 | 9/1975 | Woolfson | 178/6.8 |
| 3,919,707 | 11/1975 | Evans | 343/5 DP |

*Primary Examiner*—Robert L. Griffin
*Assistant Examiner*—Michael A. Masinick
*Attorney, Agent, or Firm*—Walter J. Adam; W. H. MacAllister

[57] ABSTRACT

Real time histogram equalization systems for a television type display that performs equalization with one or two dimensional processing on a local area or sliding window basis. For the two dimensional system, the intensity for any particular point in the image is adjusted according to a histogram of the area contained within a window immediately surrounding the point to be equalized. The histogram forming window provided by the system moves across the image in two dimensions both horizontally along each of a plurality of overlapping segments arranged parallel in the vertical dimension, and at each window position reassigned center picture elements are equalized. The processing of the histograms area or the sliding process is continued over the entire surface of the raster with the process being then repeated in a continuous fashion. The area being equalized for each window position may be selected equal horizontally and vertically to the respective amount of shifting along each segment between window positions and of the shifting of the window between adjacent segments. In order to process the histograms at the video rate and resolution the system computes mini or subhistograms from an area formed of a selected number of elements of the histogram in the horizontal dimension by the number of histogram lines in the vertical dimension of the window and sums the statistics of a selected number of the mini histograms to generate one histogram for equalizing the central area. In the continuous process the mini histograms are read out in parallel to form a plurality of histograms and multiple truncation maps which are stored in a selected number of RAM memories. Digital video is then processed through these transformed memories and stored in output buffers which may be required because of the multiplexing. In the system utilizing one dimensional processing, histograms are formed for the data of a selected number of lines in order to equalize the data of a selected line or lines and the histogram window area is moved vertically over the entire raster area.

10 Claims, 16 Drawing Figures

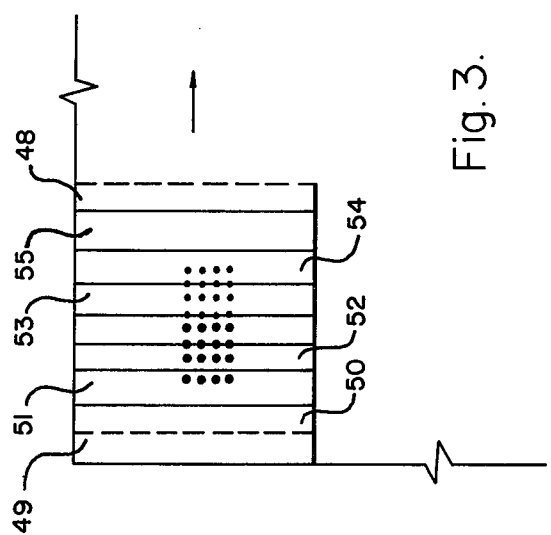
Fig. 3.
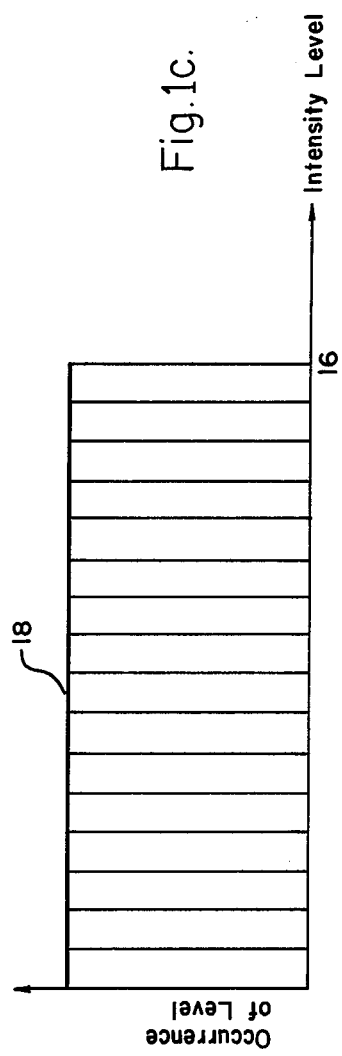
Fig. 1c.
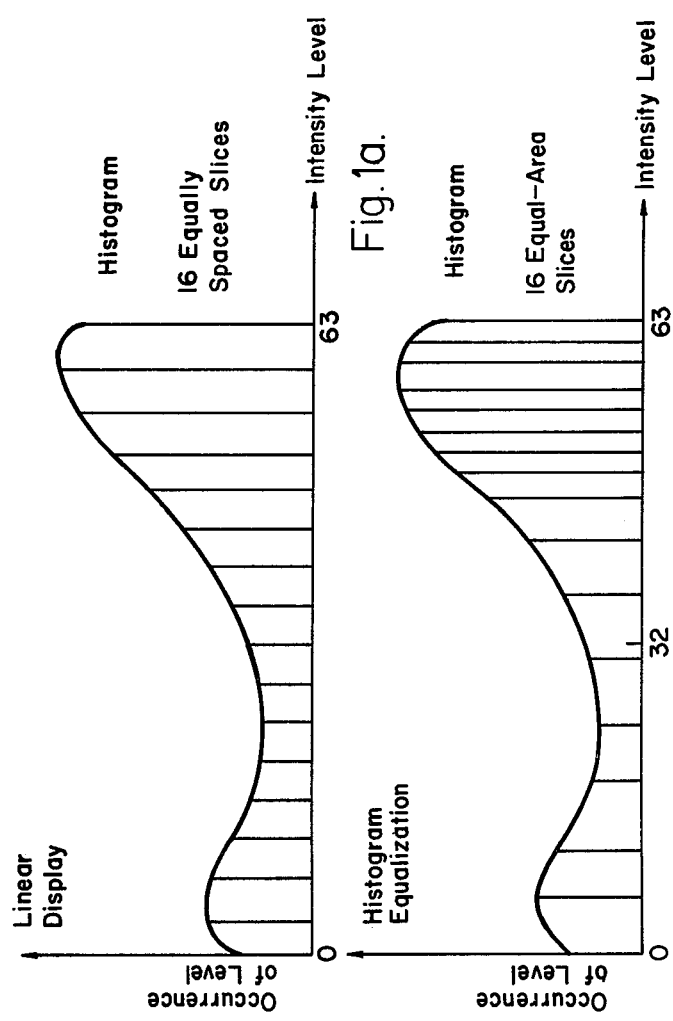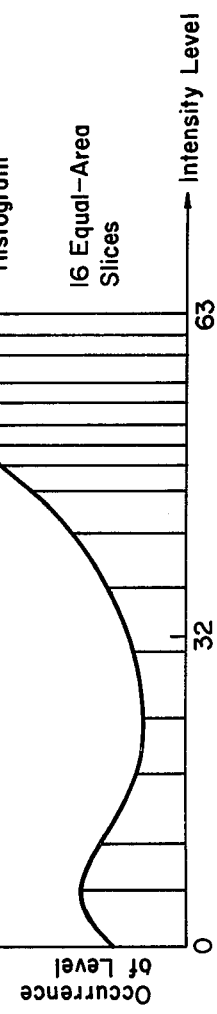
Fig. 1a.
Fig. 1b.

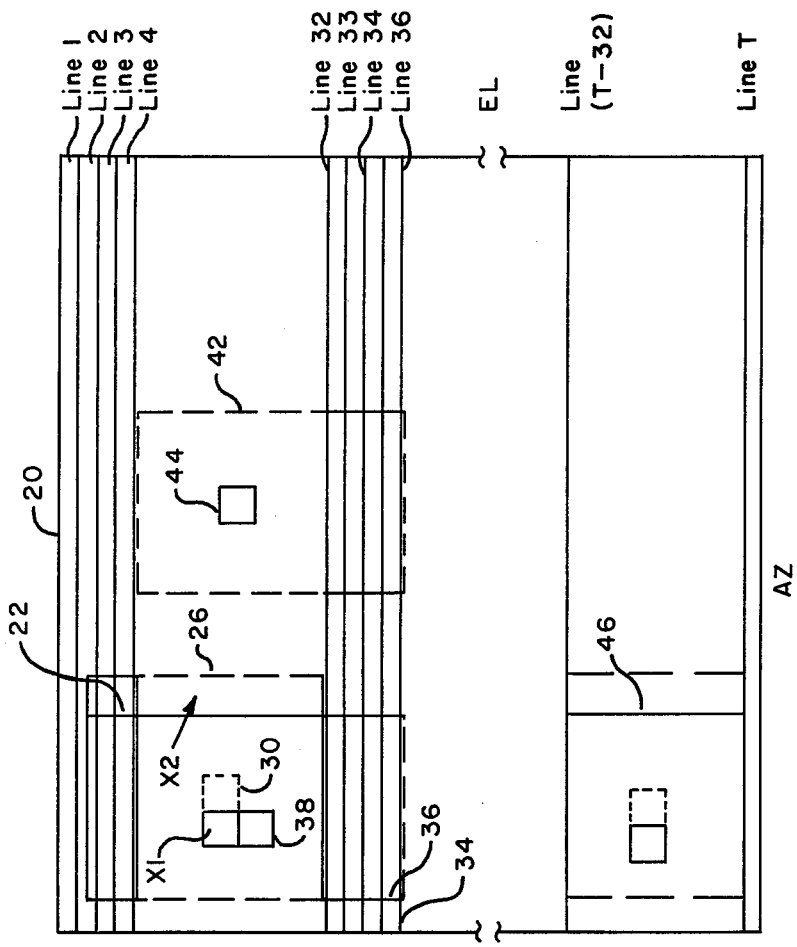
Fig. 2.
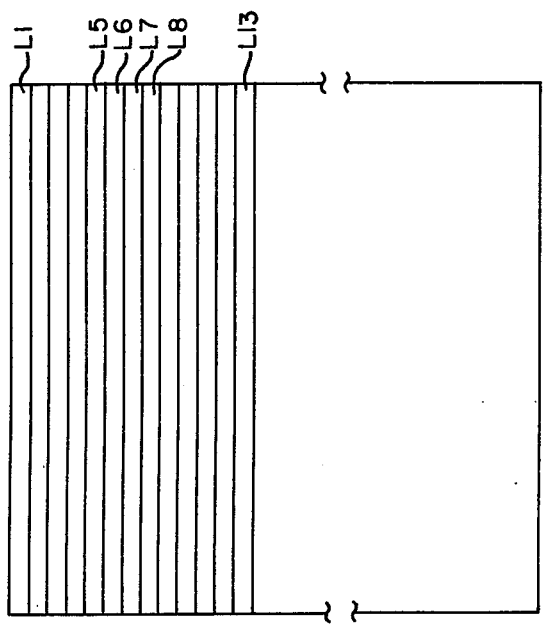
Fig. 11.
Fig. 10.

RASTER DISPLAY HISTOGRAM EQUALIZATION

The invention herein described was made in the course of or under a Contract or Subcontract thereunder with the Department of the Navy.

BACKGROUND OF THE INVENTION

1. Field of the Invention

This invention relates to display systems and particularly to a television format display system including real time local area histogram equalization.

2. Description of the Prior Art

Histogram equalization of displayed images is a unique image contrast enhancement technique that accumulates and tabulates the occurrences of the intensity of each picture element of a train of video signals to be equalized. Because the amount of information is related to the level of occurrence of each gray scale level, each intensity level in the displayed image does not carry the same amount of information. By utilizing more display gray scale levels at the intensity levels where there are more occurrences of gray scale information in the image and fewer gray scale levels where there are less occurrences the contrast and hence the detail in the displayed image can be greatly improved. The result after truncating of the video to be displayed is that at each gray scale level of the display video an equal number of occurrences of picture elements are provided. Conventionally, histogram equalization has been performed in non-real time by utilizing proper algorithms in a computer. Also it has been known to form histogram equalization with the histogram tabulation developed from the full frame but in this arrangement certain areas such as the dark portions of the image are not suitably enhanced when they are areas or brightness levels that do not have a high level of occurrence in the histogram. A real time histogram equalization system that redistributes the gray levels based on selected and changing portions or local areas of the overall image would provide improved contrast and details in substantially all areas of the picture and would be a substantial advantage to the art.

SUMMARY OF THE INVENTION

The system in accordance with the invention performs a sliding window histogram equalization of a television image in real time, continually computing histograms of selected local areas with this histogram data utilized to modify the center or near center elements of the area from which the histogram was computed. In a two dimensional system in accordance with the principles of the invention utilizing local areas of a selected number of elements and vertical lines or elements and equalizing a selected number of elements substantially at the center of the local areas, the sliding effect of the histogram is accomplished along horizontal segments by computing the statistics of the next local area shifted to the right by the same number of elements that are equalized in the center of the previous area. For each horizontal segment, this sliding process is continued until the end of that segment or group of lines is reached. The histogram area is then shifted down a few lines equal to the number of the lines of the area being equalized, the new position representing the next horizontal segment, and the horizontal shifting of the local area is continued. In order to process the histograms at the video rate and resolution the system computes mini or sub histograms equal to an area of a selected portion of elements of the histogram or local area by the number of vertical lines of the histogram area and summing the statistics. As an illustrative example the system may utilize eight successive mini histograms to generate one histogram of the local area. The mini histograms are read out in parallel to form multiple truncation maps stored in suitable transform memories and the digital video is processed through the transform memories and stored in output buffers. The concept of the invention includes both two dimensional sliding window histogram computation as well as one dimensional sliding window histogram formation.

It is therefore an object of this invention to provide a display system that develops an image with substantial contrast and detail in all portions of the image.

It is another object of this invention to provide a display system utilizing an improved histogram equalization arrangement.

It is a further object of this invention to provide a histogram equalization system for operating in real time during truncating of data to develop contrast and detail in all portions of an image being displayed.

It is still a further object of this invention to provide an improved histogram equalization system that brings out the detail in the image for substantially any distribution of the occurrence of the intensity levels over the scene.

BRIEF DESCRIPTION OF THE DRAWINGS

The novel features of this invention as well as the invention itself both as to its method of organization and method of operation, will best be understood from the accompanying description, taken in connection with accompanying drawings, in which like reference character refer to like parts, and in which:

FIGS. 1a, 1b and 1c are respectively diagrams of a full frame or raster histogram of an image illustrating a linear display, a full frame histogram equalization display showing 16 equal-area slices and a full frame histogram of a histogram equalized image with the truncated intensity levels shown equally spaced.

FIG. 2 is a schematic view of a TV format display for explaining the operation of the sliding window histogram concept in accordance with the invention.

FIG. 3 is a schematic diagram of a portion of a television display for further illustrating the sliding window histogram operation and the mini or sub histograms utilized to provide the real time system in accordance with the invention.

FIG. 10 is a schematic diagram showing the transform memory stored data as a function of the memory address for a single transform memory as an illustrated example.

FIG. 11 is a schematic diagram of a display frame for explaining the one-dimensional histogram equalization system in accordance with the invention.

DESCRIPTION OF THE PREFERRED EMBODIMENT

Figure 4:
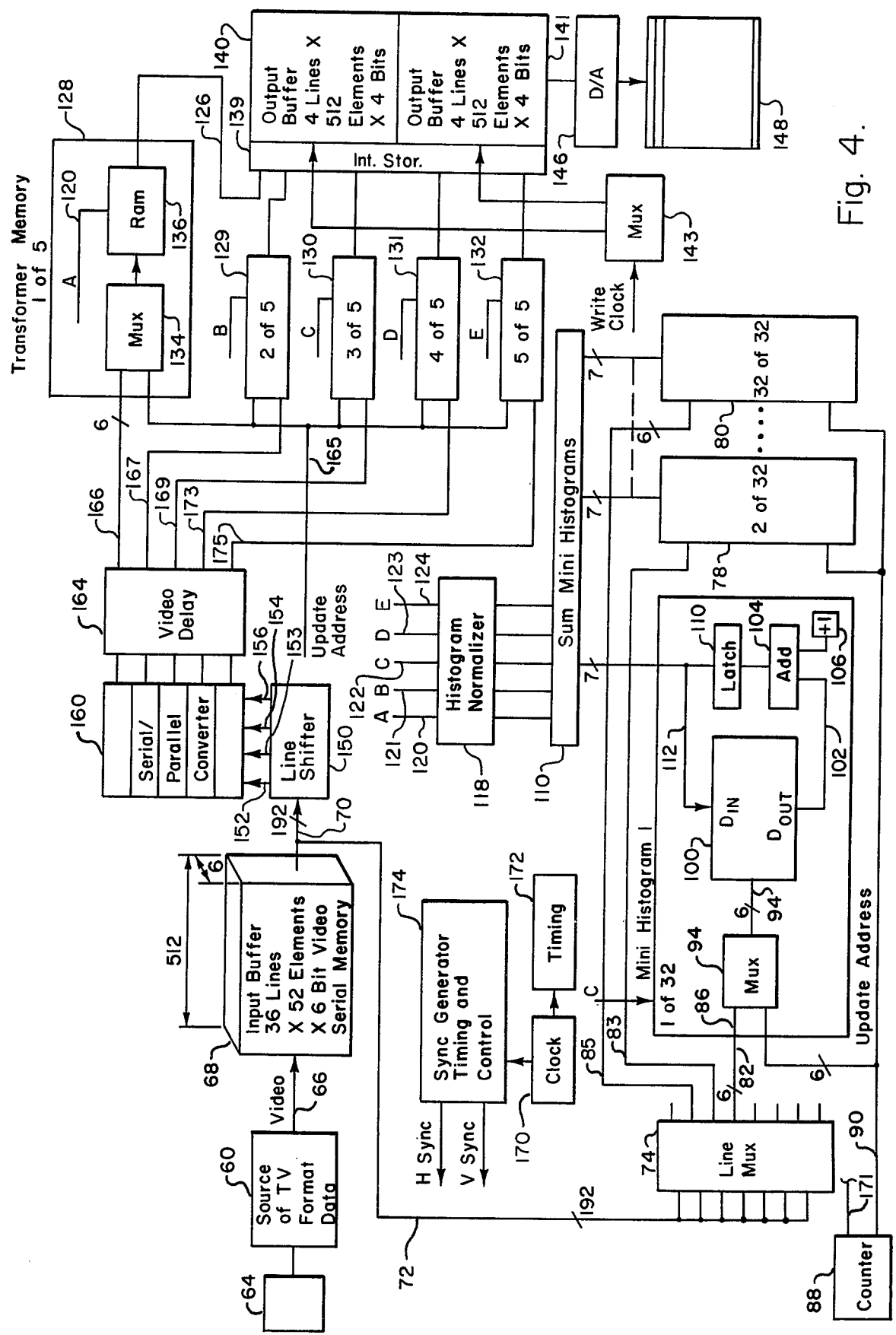
FIG. 4 is schematic block diagram, partially in perspective, showing the sliding window two-dimensional histogram equalization system in accordance with the invention.

Referring first to FIGS. 1a, 1b and 1c, a histogram of the data forming a frame or raster of an image is shown by a curve 10 which is an accumulation and tabulation of the occurrences of each picture element for each intensity level with the histogram being illustrated for 6 bit video of 64 intensity levels. Thus the intensities range over 64 quantized levels if the input video data is represented by 6 bits for each picture element as defined by the resolution of the system. A distribution of the curve 10, which for example may result from scanning of an area including a military tank in a background of grass, has been found to have a substantially small distribution of intensity level occurrences in a tread area 12 and a maximum number of occurrences in a grass area 14 of the histogram 10. This distribution indicates that the picture is generally light with few areas in the mid gray range and some predominantly very dark areas. The curve 10 shows that the distribution of gray scale information primarily lies at either end of the light/dark intensity scale for this illustrated example of scene being viewed. Thus, after truncating into image displayed on a CRT which generates 16 shades of gray as shown by the 16 equally spaced slices, the result is equivalent to slicing the gray scale area axis of the histogram into 16 equally spaced levels. Because the amount of information is related to the level of occurrences of each gray scale, each intensity level in the displayed image does not carry the same amount of information. Thus, with the distribution of curve 10, it would be an advantage to use more display gray scale levels where there are more occurrences of gray scale information and fewer gray scale levels where there is less data available. It is to be noted that this non-uniform distribution of gray scale levels can be computed by finding the total area under the histogram and dividing this area into 16 slices having equal areas as shown by the slices in FIG. 1b. The intensity level boundaries for the histogram equalized image in FIG. 1b for each slice then defines the range of original intensity levels that will be assigned a new gray scale level for the displayed image. When this is done, a histogram of the resulting displayed image has a flat or equal distribution of gray scale levels as shown under line 18 of FIG. 1c, the distribution in FIG. 1c representing a histogram equalized displayable image for a full TV frame. It is to be noted that the concepts of the illustrated distribution of FIGS. 1b and 1c also apply to local area equalization of the systems of the invention. With a conventional linear display, the area under the curve 10 of FIG. 1a of the histogram having low occurrences represents a part of the image that will have half as many gray scale levels in a processed picture than in the original scene. Thus, if the target of interest lies in that area of low occurrence of the picture element histogram equalization, processing is a substantial advantage.

Referring now to FIG. 2 a display 20 of a TV type format is shown which for example, may be formed in a standard 480 line television image with 480 lines in the vertical dimension representing 480 lines of elements with 512 resolution elements in the other or horizontal dimension. The system of the invention uses local area histogram equalization in which rather than redistributing the gray scale based on a histogram representing the entire image, the equalization can be carried out for local areas on a one or two-dimensional sliding window basis. It is to be noted that the arrangement of FIG. 2 is for illustrating a two-dimensional sliding window mechanization. Thus, the intensity for any particular point in the image is adjusted according to a histogram of the area contained within a window immediately surrounding the point to be equalized, and this window moves across the image in two dimensions horizontally through horizontal segments and vertically when changing from one horizontal segment to the next. These reassigned center picture elements then make up the total frame processed image having substantial contrast and detail in accordance wiith the invention. On images like the illustrated tank example, detail is greatly enhanced in regions like the tread rollers which have been found to appear dark with a minimum detail when the histogram is formed from data over the entire image. During a first histogram forming period the histogram is computed by storing the number of occurrences of each video intensity level for an illustrated $N_V \times N_H$ or 32 line or vertical element by 32 horizontal element area 22 for equalizing a center area 24 of $n_V$ vertical lines or elements by $n_H$ horizontal elements which in the illustrated system is an area such as 24 of 4 lines by 4 elements. After the data in the area 24 has been equalized the histogram is effectively moved with a sliding effect to the position of the dotted window 26 which is moved 4 elements to the right in order to again compute a histogram for equalizing the 4 line by 4 element area in the center thereof shown as dotted area 30. This operation continues for the data across the entire first 32 lines or horizontal segment of the display until the end of this group of lines and the histogram area or window is then shifted down 4 lines and to the left as shown by a window 34 including lines 5 to 36 to equalize an area 38. For further clarity a window 42 for developing the histogram from the corresponding data is shown to the right in the group of lines 5 to 36 for equalizing a 4 line by 4 element area 44. This operation continues until a window 46 includes group of lines T − 32 to line T and the position on the right of this group of lines is reached. In the continuous mechanization to be described, the area from which a histogram is formed or the window returns to the effective position of the window 22 and the process is repeated.

Referring now also to FIG. 3 it has been found that in order to process the histograms at the video rate and resolution a technique of computing mini or sub histograms of a 4 element by 32 line area and summing the statistics of 8 successive sub histograms to generate a local area histogram is utilized. Thus the window or histogram area 48 is formed by summing the histograms 49 to 55 allowing a continuous and high rate operation. In the arrangement of FIG. 3 the large dots represent the area being equalized by the window 48 including an area of 4 elements by 4 lines.

Referring now to FIG. 4, the two-dimensional histogram equalization system in accordance with the invention may operate with any suitable source data such as radar laser or infrared data and from any suitable source illustrated as a source of TV format data 60 which in turn may receive data intercepted by a detector, antenna or receiver and converted to TV format by a suitable scan converter. The data may be obtained either actively or passively by the source 60 as an area 64 is scanned. Also with the scope of the invention, the source of data 60 may be a television camera providing TV format data. The receiver 60 may include suitable processing circuits and analog to digital converters for providing the illustrated 6 bit video data in serial TV format on a composite lead 66, which data may be a serial string of binary 6 bit numbers with each number representing a resolution element of the scene being interrogated. The video data on the lead 66 is then applied to an input buffer 68 which may be any suitable type of memory but is illustrated as a serial memory with a capacity to store 36 lines × 512 elements × a 6 bit video receiving the data in serial fashion line to line and storing it serially. It is to be noted that the input buffer 68 is not to be limited to serial storage or to any particular type of storage unit but may be a magnetic type, dynamic type storage unit or any other suitable type, all either serial or random access. In the input buffer 68, four image lines of TV format data are loaded while 32 lines of data are being utilized. Data in the input buffer memory 68 is then transferred to a composite lead 70 of 192 lines in the illustrated example, continuing as a composite lead 72. Thus the composite leads 70 and 72 have 192 single leads for transferring 32 lines of 6 bit data into a line multiplexer 74. The line multiplexer 74 is of conventional type including a plurality of switches properly gated to transfer the lines of data to proper mini or sub histograms storage units 1 to 32 such as indicated by mini histogram storage units 76, 78 and 80. The output data of the line multiplexer 74 is on 8 composite leads such as leads 82, 83 and 85 to provide the inputs to each mini histogram such as 76, 78 and 80. The arrangement of the leads to mini histogram memories H1 to H32 can be seen in FIG. 5, the illustrated system timing allowing each composite lead to supply four mini histogram memories. A counter 88 applies a suitable update address to each of the mini histogram such as 76, 78 and 80 on a composite lead 90 during each update cycle. Mini histogram unit 76 includes a multiplexer 94 receiving both the element data and the update address to respectively address a selected memory for forming the subhistogram and to address selected memories to transfer the statistical sub histogram out of the memory. The data or the update address is applied on a composite 6 bit lead 96 to the address of the random access RAM memory 100. Thus the gray level amplitude of each word of data is utilized as the addresses in the RAM memory 100 for forming the histogram. The output of the memory 100 is applied through a lead 102 to an adder 104 also receiving a plus 1 value from a source 106 to apply the incremented value in each memory cell to a latch 110 providing a suitable holding time for writing the data back into the memory 100 through a lead 112. Thus for forming the mini histogram for a 4 element by 32 line area the RAM memory 100 includes 4 × 32 or 128 cells with each cell containing 7 bits. The amplitude of the input word which represents the intensity of the element in the scene is utilized as the address during formation of the histogram in selected memories and for each time a cell is addressed, a 1 is added thereto representing the occurrence of that intensity level within the mini histogram scene area. Thus, when completed, the RAM memory 100 includes the statistical distribution of the occurrences of each intensity level over a 4 × 32 area of the display. The selection of 8 sub histogram memories for histogram formation and for the update cycle are provided by gating of the clock pulses in a timing source 172 or in some arrangements may be provided by inhibit and activate pulses to the memories with the clock pulses continually coupled to all memories.

The combining of the mini histograms to form a histogram of a local area is performed in a summing unit 110 which, as will be explained subsequently, may include a required number such as 100 4 bit adders which may be integrated chips such as Texas Instruments Number 5483A. The summing unit 110, which also includes a multiplexer, provides 7 bit signals on 5 composite leads, each of 7 bits to a histogram normalizer unit 118. It is to be noted that 5 histogram are formed during each update cycle with each of the 5 histograms formed from combining a selected 8 spatially adjacent mini histograms and during the update cycle each of the leads out of the summing unit 110 sequentially transfers 1024 (32 × 32) histogram accumulation of occurrence values. The transform value for each amplitude of the 7 bit occurrence numbers are developed for each of the 4 bit output video levels in the histogram normalizer 118 including the level change points of the 4 bit output data which may be called truncation points and applied on leads 120 to 124 to a transform memory unit 126 including 5 separate transform memories 128 to 132 respectively receiving transform data A, B, C, D and E. Each of the transform memories, such as 128, includes a multiplexer 134 and a RAM memory 136 receiving the transform data such as on composite lead 120. The update address from 0–63 is applied on a lead 165 and through the multiplexers such as 132 to the RAM memories during the period of filling of the transform memory. The RAM memory 136 has a capacity of 16 words of 4 bits each, the 4 bits when addressed by the input video signal representing the truncated video that is applied to an intermediate storage unit 139 and alternately to output buffers 140 and 141. In some arrangements, in accordance with the invention, the output buffer 140 is not required but in the illustrated multiplexing arrangement each of the output buffers includes storage for 512 elements of 4 bits each for each of 4 image lines storage capacity. A multiplexer or switching arrangement 143 responds to the write clock pulses to select either the output buffer 140 to 141 during alternate cycles of equalization of four lines of video data. Signals from the output buffers 140 are applied through a digital to analog (D/A) as a 4 bit number and are then applied to a display unit 148 providing a TV display image format or are applied to other suitable utilization units.

Prior to loading the transform memory, with transform data, the 6 bit input element video or data from the input buffer 68 is applied on the composite lead 70 having 192 individual leads (32 image lines) to a line shifter 150. Because the data being equalized is in the central 4 image lines of the 32 line by 32 element histogram formation area, the line shifter 150 which may be a suitably timed multiplexer, provides the central four elements of data on the central 4 image lines on composite leads 152 to 156 each carrying 6 bits and to a serial to parallel converter 160 having 5 parallel shift registers, for example, to format the data with the 4 elements at the center of a local area of 4 lines in each shift register corresponding to the local area used to form a corresponding transform. The data being equalized and to be the addresses for the transform memories is then applied in parallel through a video delay unit 64 for allowing time to form the histograms and the tranforms and then applied to leads 166, 167, 171, 173 and 175 with the 6 bit addresses being then applied to multiplexing units such as 134 of the transform memories 128 to 132. At each address for transform memory units 128 to 132 a 4 bit truncated output video value as derived from the histogram normalizer 118 is read out of the RAM memory such as 136 and applied to the intermediate storage unit 139. The timing and synchronization of the system is performed by a clock 170 which may be the write clock applies clock pulses to a timing unit 172 and a synchronization generator unit 174.

Figure 6:
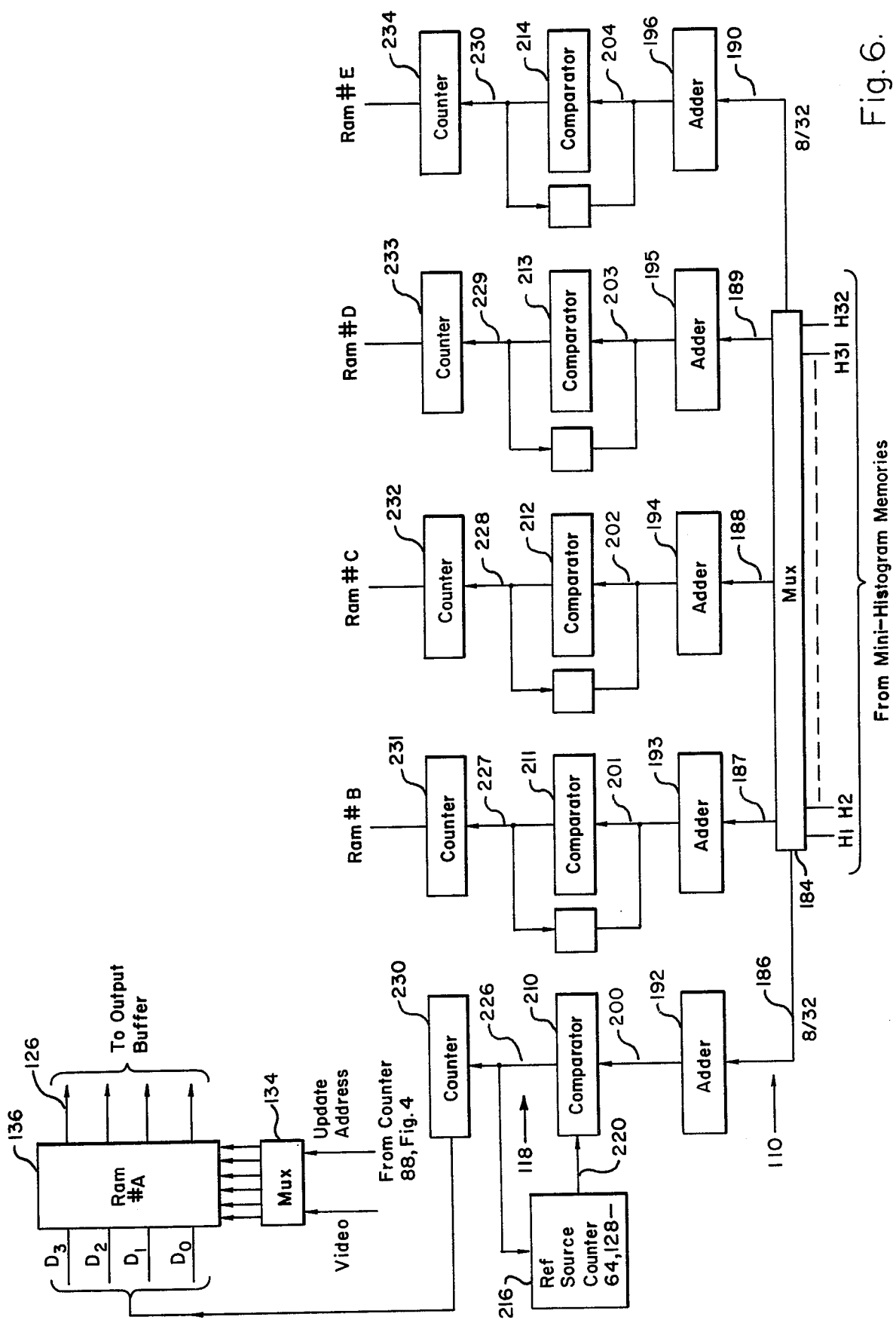
FIG. 6 is a schematic block diagram for further illustrating the structure for summing of the mini histograms and the transform memories in the system of FIG. 4.

Referring now also to FIG. 6 as well as to FIG. 4, the transform memory as well as the histogram normalization arrangement will be explained in further detail. A counter such as the counter 88 of FIG. 4 repetitively counting from 0 to 63 applies the update address on a lead 171 to the multiplexer 134 and in turn to the RAM memory 136 during the update cycle for transferring the 4 bit transforms into sequentially addressed cells of the RAM memory 136 on the composite lead 120 as the bits $D_0$, $D_1$, $D_2$, and $D_3$. During the data equalization portion of the cycle, the video signals having a format of the same 4 horizontal element positions for 4 sequential lines from the video delay unit 164 is serially applied on the lead 166 through the multiplexer 134 to the RAM memory 136 for addressing to cause reading out the stored tranforms as the truncated 4 bit output video. The transfer of the video is the same for the other 4 transform memories except different 4 horizontal elements are applied to each transform memory. The multiplexer 134 thus switches between the composite leads 167 and 171 depending upon the portion of the overall cycle that is being performed. A similar operation is performed in each of the 5 transform memories of FIG. 4.

For the histogram normalizing operation, the mini histogram H1 to H32 from the mini histogram memories such as 76, 78 and 80 are applied to a multiplexer 184 which is properly controlled from the timing unit 172 of FIG. 4 to apply the correct mini histogram data of different selected 8 mini histograms to each of composite output leads 186 to 190. The 8 mini histograms such as H1 to H8 are sequentially transferred with 64 sequentially addressed values being transferred for each of the 8 mini histograms. The adders 192 to 196 respectively receive the mini histogram data on leads 186 to 190 (each of 7 bits) so that each adder forms a complete histogram of 32 lines by 32 elements. The histogram accumulation value for each update address is then applied for each respective histogram through respective composite leads 200 to 204 to respective comparators 210 to 214. A reference source counter such as counter 216 for comparator 210 is provided to develop truncation values of 64, 128, 192 up to 1,024 increasing by 64 at each truncation point, and at each clock pulse applies these values through a lead such as 220 to the comparator 210, or from separate reference source counters to comparators 211 to 214. When the histogram value for any reference level equals the value of the comparator, a pulse is formed on the output lead of each comparator on leads 226 to 230 and a portion of the pulse is fed back such as from the lead 226 to the reference source 216 for changing the count therein. At the same time the pulse on any of leads 226 to 230 changes the count of corresponding counters 230 to 234, which count is applied to the output lead such as the lead 120 and into the RAM memory 136. The transform or RAM memories are loaded in parallel during the period of forming the histograms and the tranform data. For each cell of the RAM memory 136 as well as the other transform memories a count from the counter such as 230 is stored until the entire transform is transferred to those memories.

Figure 7:
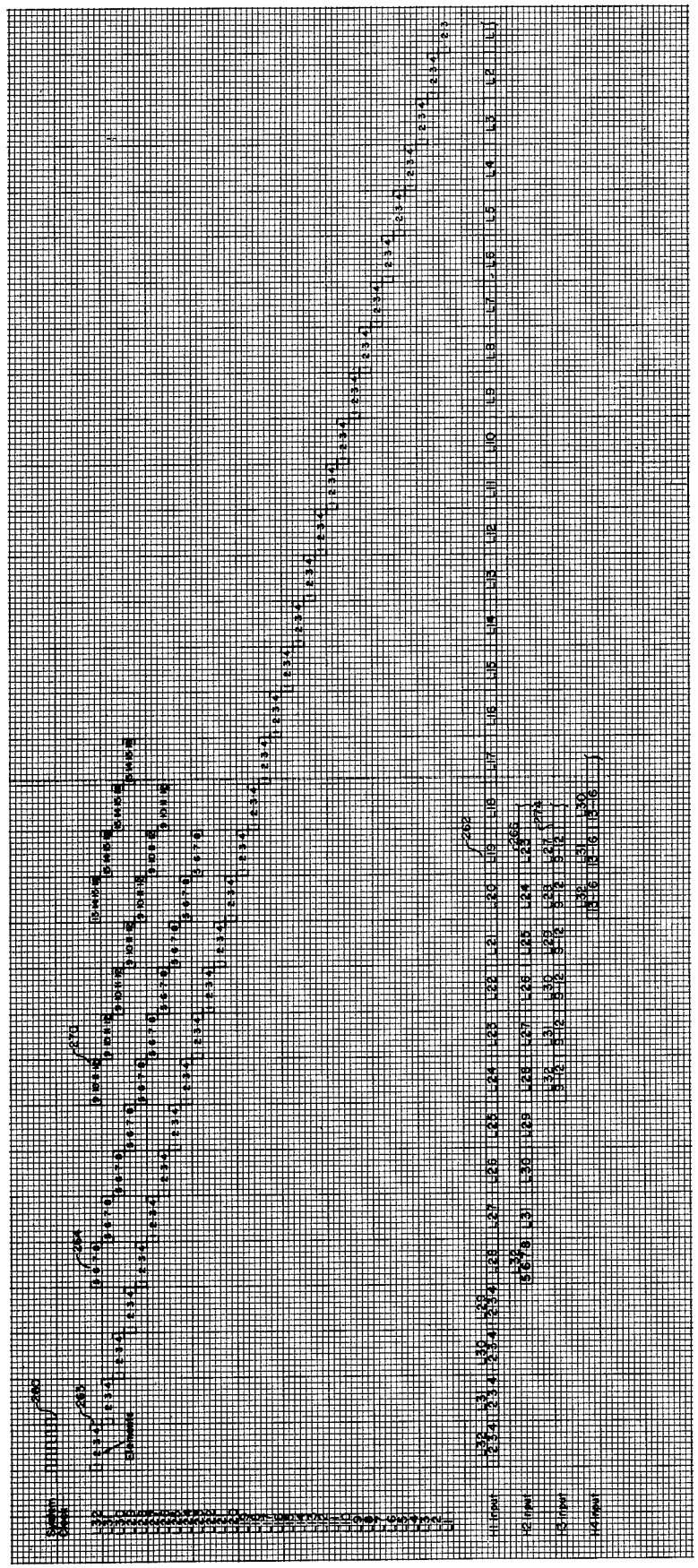
FIG. 7 is a schematic diagram of a scene or display lines and mini histogram inputs both as a function of time showing the resolution elements readout from the input buffer memory and the resolution elements received by the mini histogram accumulation memories.

Referring now to FIG. 4 and to the timing diagram of FIG. 7, the input serial buffer 68 storage capacity is for 36 image lines so that 4 image lines can continuously be updated by the video received on the composite lead 66. The system clock of the waveform 260 which is also the write clock controls the transfer operation from the input buffer memory 68 and in the illustrated arrangement the data from line 32 in bracket 263 is first transferred as elements 1, 2, 3 and 4 into the H1 or mini histogram memory unit 76 as shown by a timing line 262. This transfer into the mini histogram H1 memory continues until the data is readout from the buffer memory 68 in groups of 4 elements from each of the lines L32 to L1. At the time when the elements 5, 6, 7 and 8 are read out from the buffer memory 68 as shown by a bracket 264, that data from line 32 is read into the second histogram memory as the H2 input as shown by a timing line 266. At the time when the elements 9, 10, 11 and 12 are read for line 32 from the input buffer memory 68 as shown by bracket 270 that input for line 32 is read into the third mini histogram memory as the H3 input as shown by a timing line 274 and continues for each line such as line 31, line 29 and line 28. For any image or TV line such as line 32 the video for 4 elements is written into a different mini histogram memory (H1 to H32 and continuing H1 to H32), four periods later with each period being for four elements, so that histograms of 5 adjacent local areas can be continually formed in the summing unit 110. Upon completion of reading of the data for all 32 lines into the 32 mini histograms memory the process shown in FIG. 7 is repeated in a continuous manner.

Figure 8:
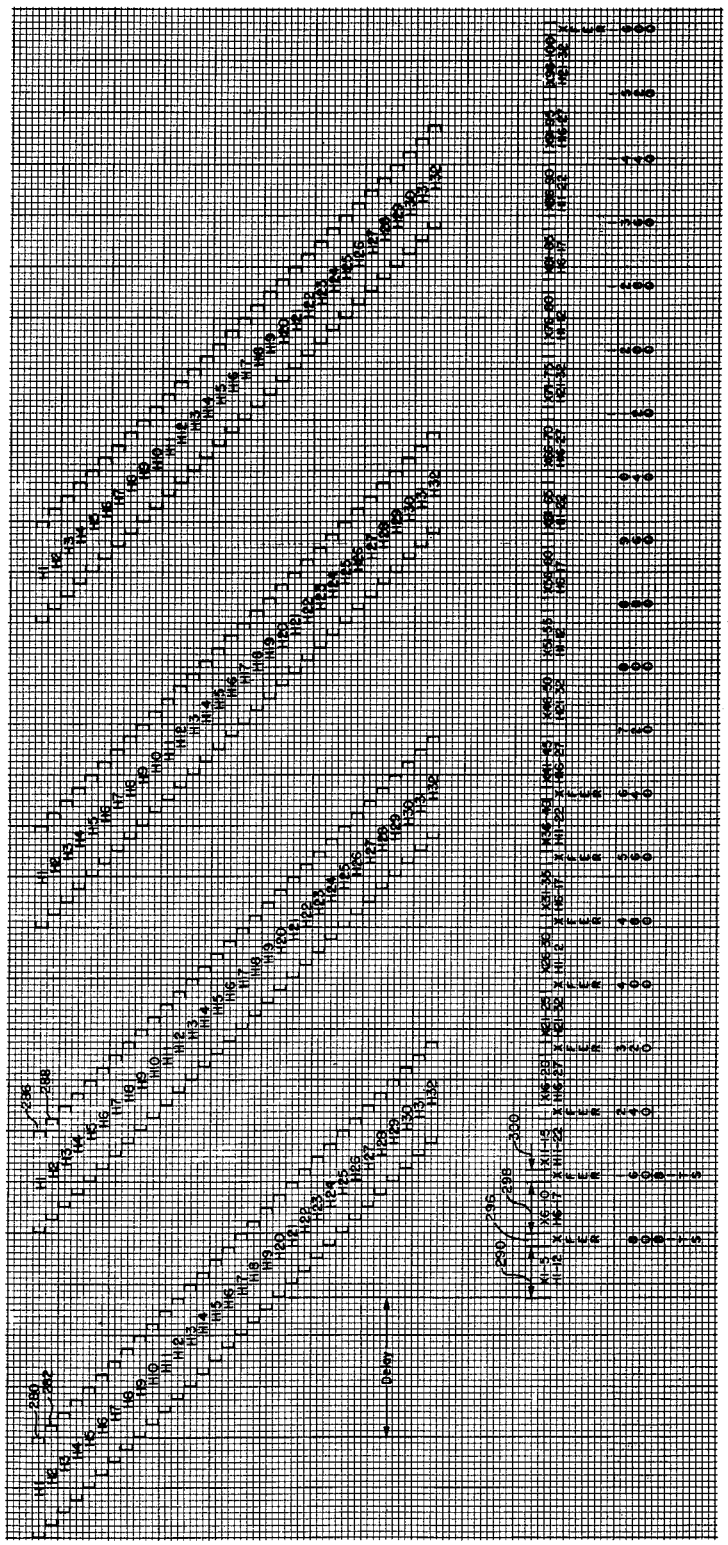
FIG. 8 is a schematic diagram as a function of time showing the sequence of writing mini histogram data into the mini histogram memories and the processing of the mini histogram to transfer the tranforms of a plurality of histograms to the transform memories.

Referring now to FIG. 8, the loading of the mini histograms is shown with a time scale so that for each bracket such as 280 and 282 representing loading of H1 and H2, 4 horizontal elements from each of the 32 lines is written into respective histogram memories H1 and H2. This process continues sequentially with histogram memories H1 and H2 receiving new data at time shown by respective brackets 286 and 288. Thus it can be seen that the histogram memories are continually updated with the multiplexing operation in accordance with the invention. At the beginning of a period 290, sufficient data has been accumulated to form the histogram H1 to H12 so that during that period 290 the transform X1 to X5 is transferred to the transform memory unit 126. During a period 296 the input video is transferred to the transform memories to provide the equalization. A delay period 297 represents the time delay of the video delay unit 164 starting at a time 299 when element 15 of line 15 is transferred to the histogram memories. During the period 298, the sub histograms or mini histogram H6 to H17 are formed and combined for the next histogram area and these transforms X5 to X10 are utilized for equalization during a period 300. Thus it can be seen that the operation of writing into the mini histogram memory forming the mini histogram and combining the mini histograms to form a histogram of the area to be equalized is a continuous process.

Figure 9:
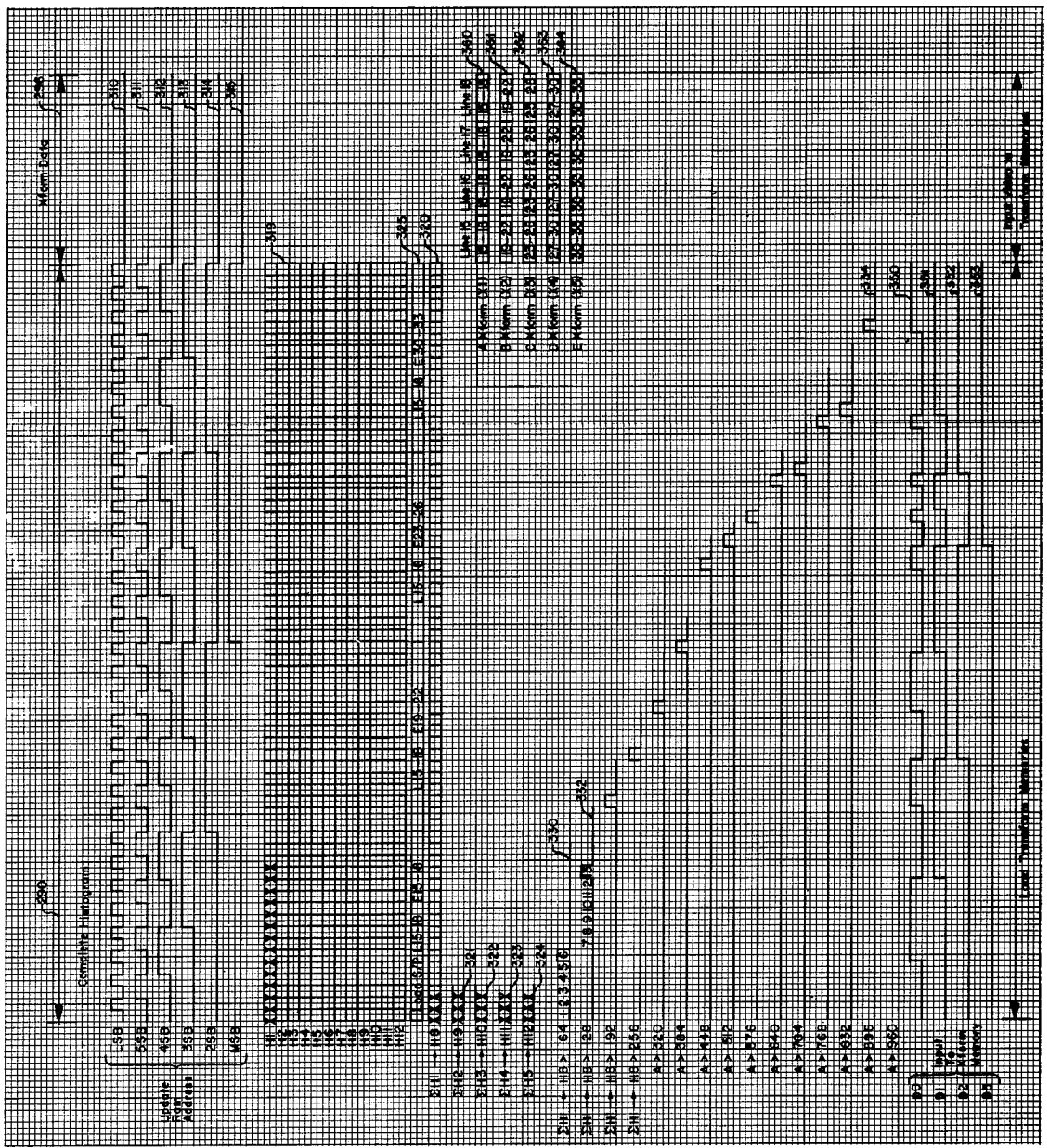
FIG. 9 is a schematic diagram as a function of time showing further detail of summing of the mini histograms, the transfer of the combined mini histograms to the transform memory and the equalization of data in the transform memories.

Referring now to FIG. 9 which further shows the periods 290 and 296 of FIG. 8, the operation will be explained in further detail. The pulses of waveform 310 to 315 respectively show the least significant bit to the most significant bit of the update RAM addresses as well as the mini histogram update addresses provided by the counter 180 of FIG. 5. During this period 290, the data is being derived from the mini histogram memories H1 to H12 as shown by a matrix 319 and the summation of the mini histograms is being performed by summing H1 to H8, H2 to H9, H3 to H10, H4 to H11, and H5 to H12. At the same time, in response to the comparators 210 to 214 of FIG. 5 and each multiple of 64, pulses, which are shown only as an illustrative example of a histogram, of waveforms such as 330, 332 and 334 indicating the accumulated value having reached a mulitple of 64 are transferred to the counter 230 of FIG. 5. At the same time, as is shown by pulses of waveforms 350 to 353, the transform data $D_0$, $D_1$, $D_2$ and $D_3$ is transferred to the transform memory 126 with the pulses representing truncation points for the output video. It is to be noted that the transform data in each address of the transform memory represents the amplitude of the equalized and truncated output video. The summing of the different groups of 8 mini histograms is shown by waveforms 320 to 324. A waveform 325 shows the periods of loading the input video image lines and elements such as image lines L15 to L18 and elements 15–18 thereof, into the serial to parallel converter 160 to be available for addressing the transform memories.

At the beginning of the period 296 all of the transform data has been transferred to the transform memory 126 and the input video of the 5 corresponding equalization areas is then read from the video delay unit 164 and equalized by the transformation as shown by the X–1, X–2, X3, X4, and X5 data applied to the A, B, C, D, and E transform memories indicated by waveforms 360 and 364. The A transform memory 128 for the 4 central lines 15 to 18 during 4 subsequent periods transforms the input video for elements 15 to 18 because in the illustrated example of lines 1 to 32 and element 1 to 32, lines 15 to 18 and elements 15 to 18 are in the central area of the histogram. For the next full histogram as shown by waveform 361, the central area to be equalized includes lines 15 to 18 and elements 19 to 22. For the second full histogram the lines for equalization are 19 to 22. The elements of the central area of the third, fourth and fifth histogram are 23 to 26, 27 to 30 and 30 to 33, all for lines 15 to 18. The operation continues in a similar fashion for each following data transfer period, with sequential elements and lines 15 to 18 for the first segment and for lines 22 to 26 for the second segment across the frame. It is to be noted that this multiplexing in the transform memory as well as throughout allows the data to be equalized and applied to the output buffer 140 at TV scan rates. As shown in FIG. 8, the operation of the histogram formation and the equalization of the central area as shown in FIG. 8 is continually repetitive, being repeated at time intervals such as periods 298 and 300. The waveforms 360 to 364 illustrate the formatting of the video in shift registers in the serial to parallel converter 160 of FIG. 4. It is to be noted that although the top and bottom 12 lines are not equalized in the illustrated system, a completely equalized picture may be provided by blanking these lines at the display. Also equalization may be performed over an unfilled register or to obtain improved contrast, the blanked area can be mapped into one intensity level.

Figure 5:
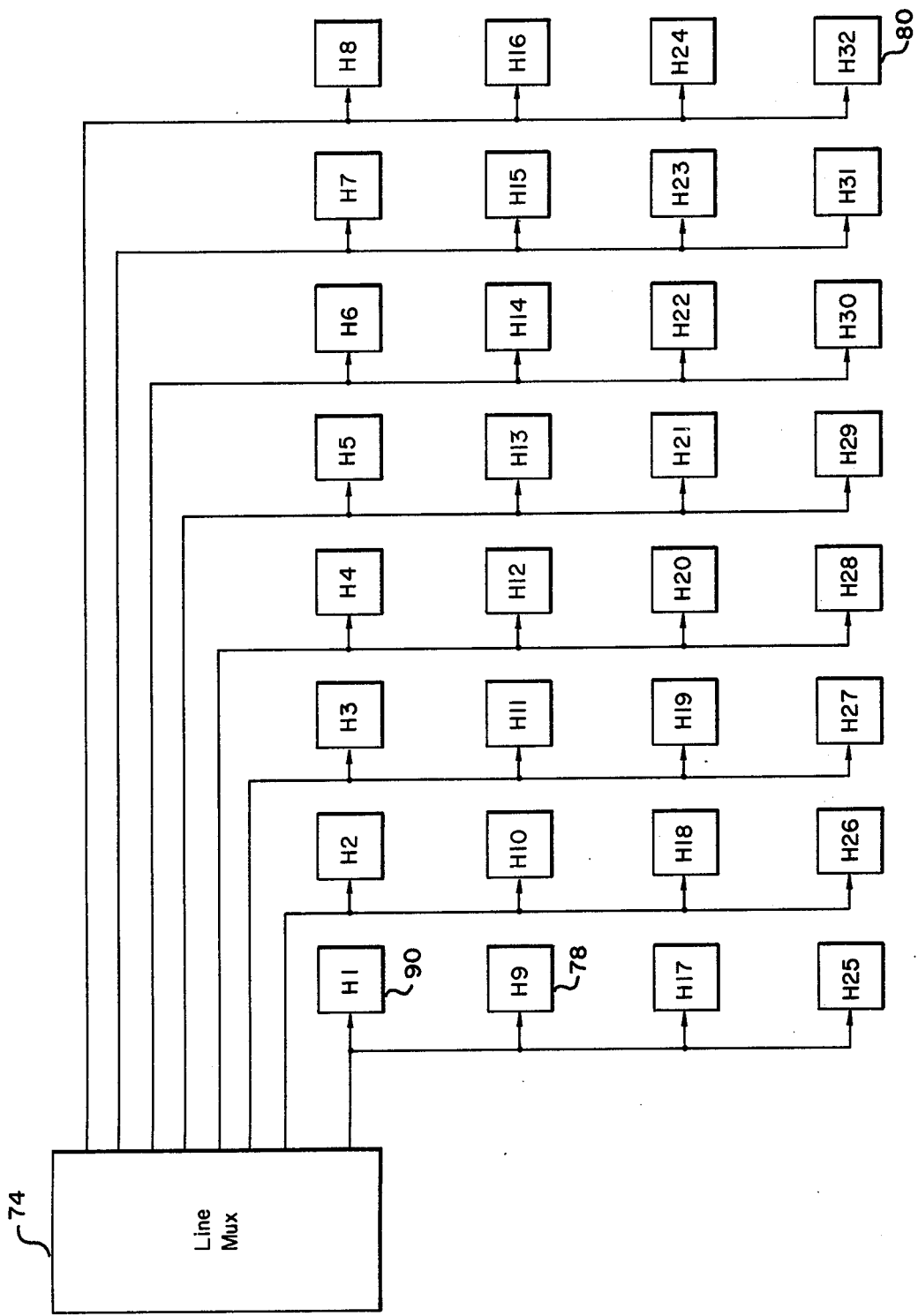
FIG. 5 is a schematic block diagram for further explaining the loading of the mini histogram memories.

Referring now to FIG. 10 as well as to FIG. 4, an illustrative example is shown of the data stored in RAM memory 136 of the transform memory 128 in response to the counter 180 of FIG. 5. The transform data is transferred from the counter 230 starting with 0000 for memory addresses 0 to 5, then in response to a truncation pulse changes to 0001 and storing that value in sequential addresses until the transform data changes to 0010. This operation continues until at the 63 memory address which stores all ones completing the transfer of the transform data. The next step in the operation for the equalization of the input video is to address the stored transform values with the actual amplitude of the input video. As each memory cell is addressed, such as memory address 7, the truncated 4 bit video 0001 is read therefrom and applied to the output buffer 140. It is to be noted that the principles of the invention are not to be limited to this particular arrangement for equalizing the input video with a memory for each video input amplitude but that other arrangements within the scope of the invention the truncation value may be stored and compared with the input video such as by a counter rapidly and sequentially addressing a plurality of storage units in response to each video input amplitude. It is to be noted that the principles of the invention are not to be limited to the particular timing and multiplexing arrangement shown in FIG. 4 but includes any suitable timing and control arrangement.

Referring now to FIG. 11 which illustrates a portion of the lines of a TV display format, the one dimensional processing in accordance with the principles of the invention will be explained. Multiple line buffers are used and a histogram is generated of the video within the buffer with the histogram being continually updated by adding components at the input to the buffer and substracting video components at the output of the buffer. The buffer memory in this arrangement also acts as a video delay line so that the central element can be operated upon. In the illustrated system the buffer memory stores 8 lines L1 to L8 of video data and during a first period the histogram memory is formed from all the data of image lines L1 to L8 and the data of the entire line 4 is equalized by the transforms stored in a RAM memory. During the next equalization period histograms are formed from lines L2 to L9 and the data representing line L5 is equalized. This operation continues for the entire frame and then repeats the frame. Although the top and bottom few lines are not equalized, a totally equalized display may be provided by blanking out those lines at the top and bottom of the display unit.

Figure 12:
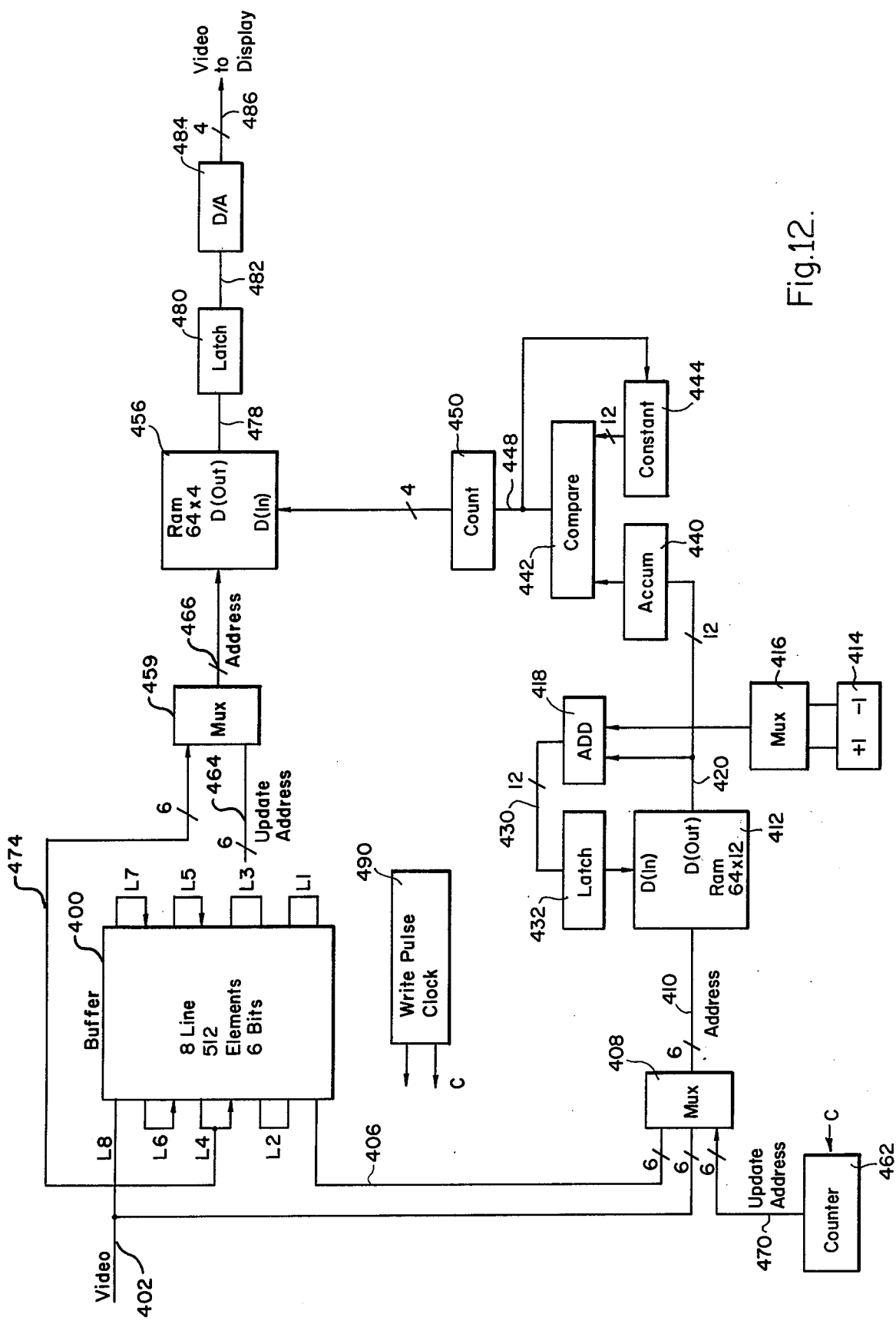
FIG. 12 is a schematic block diagram of the one-dimensional histogram equalization system in accordance with the invention.

Referring now to FIG. 12, the one dimensional histogram equalization system in accordance with the principles of the invention includes a buffer memory 400 receiving the input video data on a composite lead 402 and serially storing the data for 8 image lines of the scan being scanned or of the display format. The lines L8 to L1 are shown to indicate the serial storage in the buffer memory 400. Old data in the buffer memory 400 is applied through a composite lead 406 to a multiplexing unit 408 which includes properly controlled switches, and is then applied therefrom through a composite lead 410 of 6 wires to a memory 412 which, for example, may be a read address or RAM memory storing the frequency of occurrence of histogram of 8 image lines of data. The old histogram data on the lead 406 when addressing the memory 412 is subtracted by a minus 1 from a source 414 applied through a multiplexer or switching arrangement 416 and in turn to an adder 418, where it is subtracted from the output of the memory 412 on a composite lead 420. The subtracted value for each address is then applied through a composite lead 430 and through a latch or storage unit 432 into the input of the RAM 412. At alternate times, the new data for an element line is applied from the composite lead 402 through a composite lead 434 and through a multiplexer 408 and the lead 410 to address the RAM memory 412 and add +1 at that memory address from the source 414. The adding and subtracting for each data value on the lead 402 occurs at alternate portions of the element clock pulse so that a complete updating of the RAM memory 412 occurs when a complete line of new data has been received on the lead 402 and transferred out of the buffer memory 400. When the histogram is complete or updated in the RAM memory 412 the accumulations at each address are applied through the lead 420 of 12 wires to an accumulator 440 where it is compared in a comparator circuit 442 with an increasing value from a source 444 which as previously explained is a multiple of 64. Constant source 444 thus is a counter which is incremented by one to increase its count by 64 each time an output is provided by the comparator circuit on a lead 448. Also, each time the comparison occurs in the comparator 442, a counter 450 is incremented to provide a different truncation value in the contents of a transformed memory 456, that transformed memory having in the illustrated examples, 64 word cells each of which is stored a transform value during an update address period. A multiplexer 459 receives an update address from a counter 462 on a composite lead 464 which is then applied as the address on a composite lead 466 to the memory 456 for transferring the transform data thereto. It is to be noted that the counter 462 also supplies an update address on a composite lead 470 to the multiplexer 408 for reading out the histogram during the period of forming the transform and transferring it into the memory 456.

During the equalization period, the 6 bit video data representing image line 4 is applied on a composite lead 474 to the multiplexer 459 as the address in the RAM memory 456 to generate a 4 bit equalized and truncated video on an output compositor lead 478. The truncated video is formed in the transform memory during the same period that the histogram 412 is being updated. The output video on the lead 478 is then applied to a latch 480 which is a storage unit such as a 4 flip-flops and then is applied through a composite lead 482 to a suitable digital to analog converter 484 and in turn through a lead 486 as the output video to the display for example. A memory clock 490 is provided to apply clock pulses C to the various units throughout the system to control synchronization.

Figure 13:
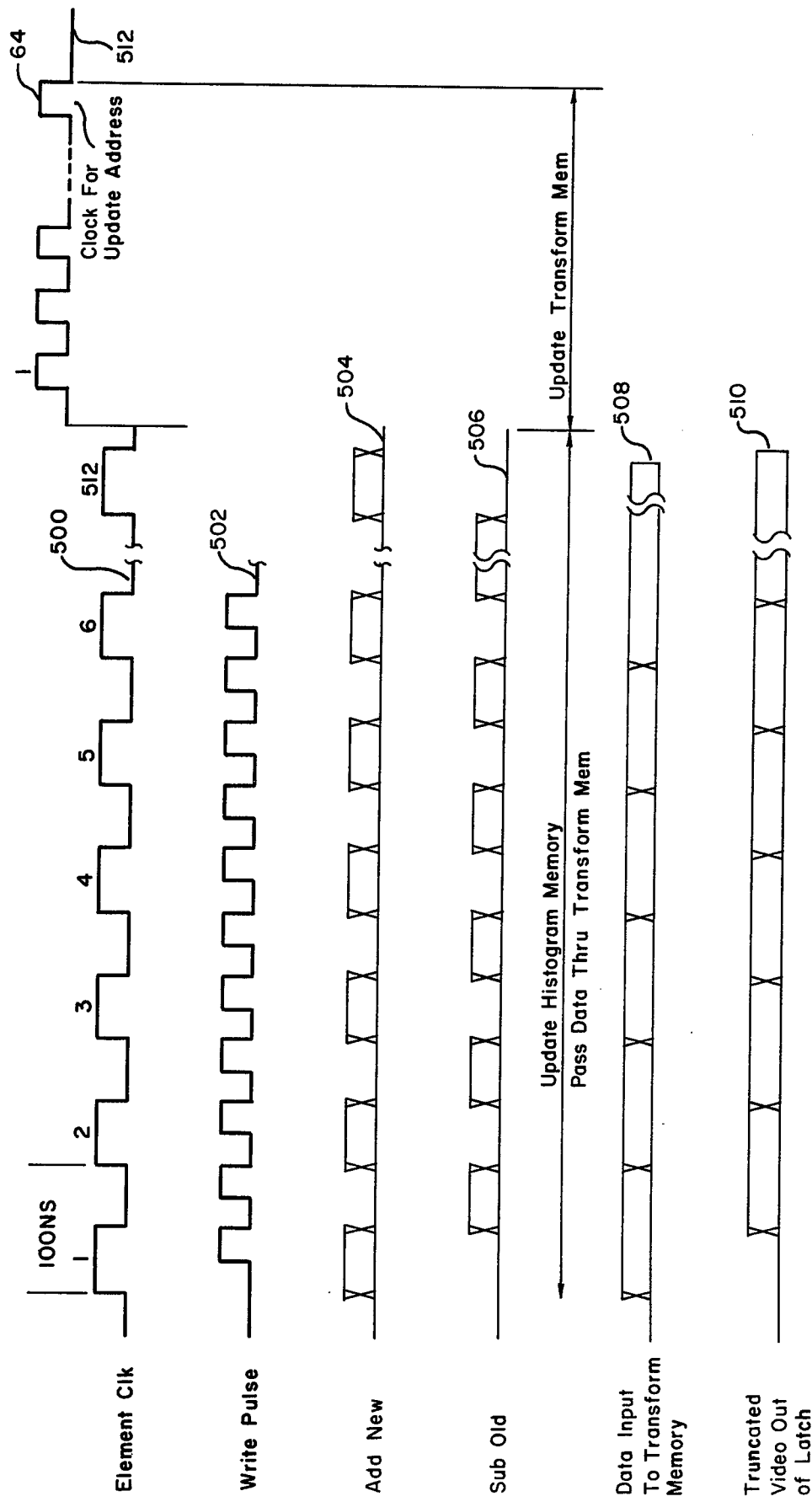
FIG. 13 is a schematic diagram of waveforms and occurrences as a function of time for explaining the operation of the one-dimensional histogram equalization system of FIG. 12.
Figure 14:
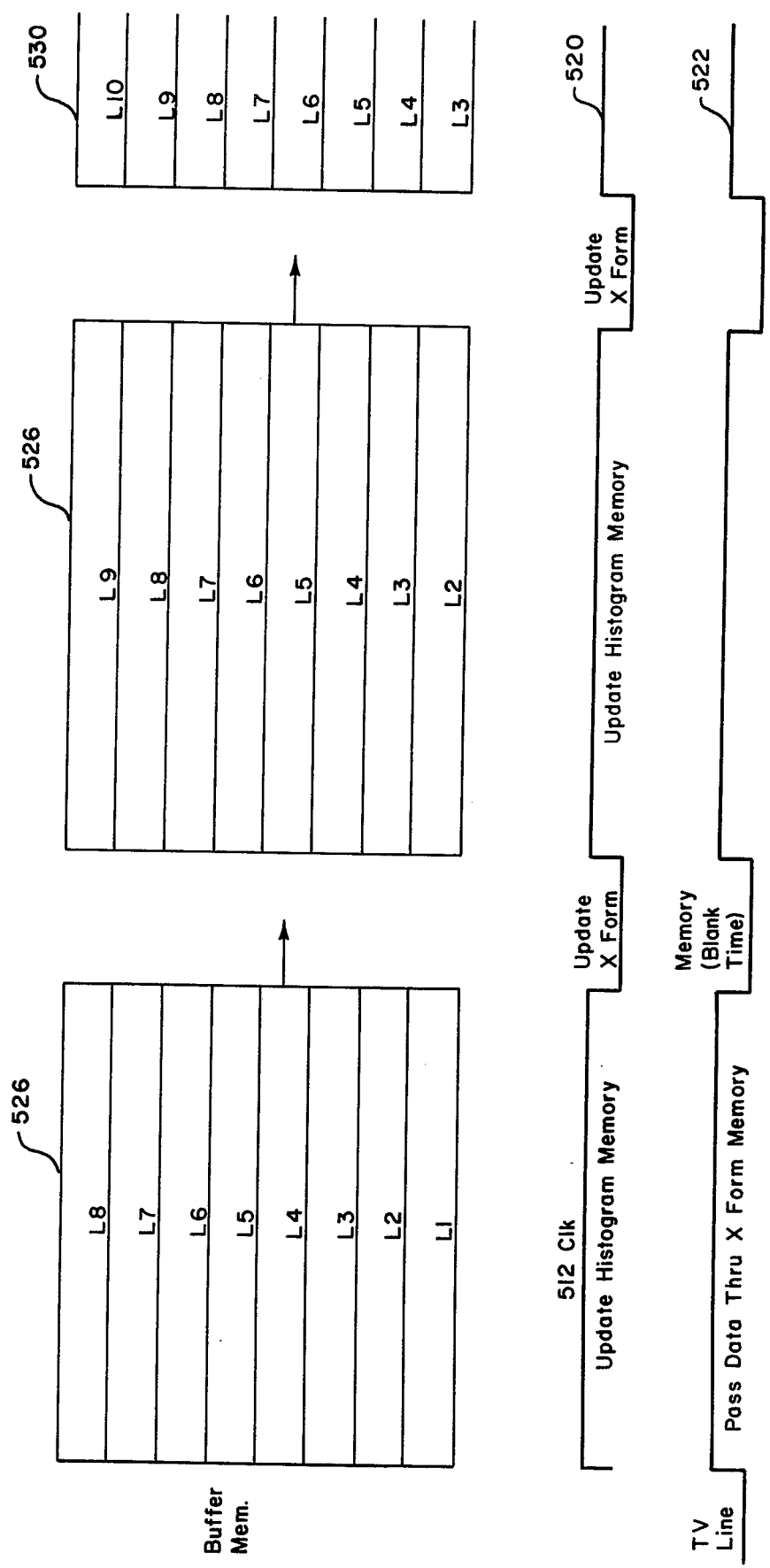
FIG. 14 is a schematic diagram of waveforms and occurrences as a function of time for further explaining the operation of the system of FIG. 12.

Referring now also to the waveforms of FIGS. 13 and 14, the element clock of a waveform 500 is applied to the buffer memory 400 and has pulses numbered 1 to 512 for transferring the video data into the buffer memory 400. A write pulse waveform 502 controls writing of the video data into the buffer memory 400 and pulses of a waveform 504 controls adding the new histogram data into the memory 412 by providing control of the memory 412 and of the multiplexers 408 and 416. The substract old pulses of waveform 506 occur between the pulses of the waveform 504 and passes the old data on the lead 406 through the multiplexer 408 which is controlled by that waveform to subtract 1 to each address in response to control of the multiplexer 416 as well as the multiplexer 408. Because the equalization of the data occurs during the same period as the formation of the histogram, the signals of a waveform 508 indicates the L4 video data during the illustrated period being applied to the RAM memory 456 and the signals of a waveform 510 indicate the latched output video being read from the latch circuit 480. The pulses of waveform 512 show the clock for the update address during the blanking time of the display when the transfrom memory 456 is updated this period following the update histogram cycle. Thus as can be seen in FIG. 14 by a waveform 520, the histogram memory is updated followed by updating of the transform memory which may be during the display blanking time, followed in the same sequence by the updating of the histogram memory and the updating of the transform memory. As may be seen by waveform 522, the input video data of one line is passed as an address to the transform memory through the multiplexer 459 and during updating of the transform memory the update address is applied through the multiplexer 459. Blocks 526, 528 and 530 show the contents of the buffer memory 400 during each update histogram memory for 3 cycles to indicate the contents therein being lines L1 to L8 during the first period, lines L2 to L9 during the second period and lines L3 to L10 during the third period. The one-dimensional histogram equalization in accordance with FIG. 12, provides sliding of the histogram statistical area from one line to the next throughout the entire scene of TV display format, repeating this continuously. A one-dimensional histogram equalization has been found substantial improvement of the picture contrast as discussed previously relative to the two-dimensional equalization system. Thus there has been provided a histogram equalization system providing either a full sliding window two-dimensional histogram and equalization system, or a sliding line histogram or a one-dimensional equalization system. The system improves the image contrast of a video display in a television raster format for example by redistributing its dynamic range transfer characteristics to more fully utilize the display dynamic range capability. Both the two dimensional and the single dimensional system of the invention are thus adapted to the statistics of the scene to provide an improved display. It is to be noted that the system of the invention is not to be limited to the particular illustrated multiplexing arrangements or to the number of bits shown in the illustrated examples. Also the system of the invention is not to be limited to any particular types of memories or to the particular arrangement illustrated for forming the transform and forming the output video in response to the transform or into a truncated truncation values.

What is claimed:

1. A histogram equalization system for converting data from a source of a first number of bits to a second number of bits for forming a display raster including a selected number of vertical elements by a selected number of horizontal elements comprising:
first means coupled to said source of data for forming sub histograms of a selected portion of a histogram area,
second means coupled to said first means for forming a histogram of a selected area of said raster,
transform means coupled to second means for forming transformed data representing truncation points,
third means coupled to said transform means for storing said transform data, and
means coupled to said source for transforming input data of selected elements in said histogram area through said third means to transfrom said input data to truncated equalized output data.

2. The combination in claim 1 in which said first means includes means for continually forming a plurality of sub histograms from an area of $N_V \times N_H$ elements, said second means including means to form histograms of the $N_V \times N_H$ elements in sequentially different positions along said raster moving $N_H$ elements for each new histogram, and
said means coupled to said source including means to transfer data of an area of $n_V \times n_H$ elements in said histogram area for each histogram transform stored in said third means.

3. The combination of claim 2 in which said means coupled to said source includes line shifting means for transferring data of said area of $n_V \times n_H$ elements for each histogram.

4. The combination of claim 3 in which said first means provides said sub histograms in a format across said raster to form histograms across each $N_V$ elements of said raster sequentially moving $n_H$ elements.

5. A histogram equalization system for converting rasters of input data representing resolution elements and received from a source to histogram equalized data comprising:
first means for forming histograms of areas of said raster sequentially across different groups of lines of said raster,
second means coupled to said first means for providing transform data from said sequentially formed histograms,
third means coupled to said second means for sequentially storing said transform data, and
fourth means coupled to said source and responsive to said input data and to said third means for sequentially transferring data representing a selected number of resolution elements of the input data within the area of each sequential histogram to said third means to develop said histogram equalized data.

6. The combination of claim 5 in which said first means includes means to form sub histograms of said area of said raster and to combine said sub histograms to form said histograms.

7. The combination of claim 6 further including line shifting means coupled between said source of input data and said fourth means for sequentially transferring said selected area of input data.

8. The combination of claim 7 in which said second means includes histogram normalizing means for forming transform data and said third means includes memory means for storing a histogram equalizing value for each value of said input data.

9. The combination of claim 5 in which said first means includes means to form histograms of groups of lines and said fourth means includes means for sequentially transferring data representing a selected line within the group of lines forming each sequential histogram.

10. A histogram equalization system for responding to a source of input data of a first number of bits to provide truncated data of a second and lesser number of bits equalized by having an equal number of occurrences of each value of said second number of bits for each $N \times L$ area of a raster area, where N is a selected number of bits in a first dimension and L is a selected number of elements in a second dimension comprising:
first means coupled to said source of input data for forming a plurality of histograms of $N \times L$ areas sequentially along a plurality of segments along said raster area with each segment including n different lines of data, each histogram except the first for any segment for each segment including $n$ different elements,
second means for forming transform data for each of said histograms,
third means coupled to said second means for storing the transform data, and
fourth means coupled to said source for transforming data of an $n \times n$ area of lines and elements to said third means to form said truncated data said $n \times n$ area for each histogram being within the $N \times L$ area of that histogram.

* * * * *